US007941785B2

(12) United States Patent
Cole (10) Patent No.: US 7,941,785 B2
(45) Date of Patent: May 10, 2011

(54) SYSTEM AND METHOD FOR MANAGING INFORMATION OBJECTS

(75) Inventor: Gary Cole, Driftwood, TX (US)

(73) Assignee: Oracle America, Inc., Redwood City, CA (US)

( * ) Notice: Subject to any disclaimer, the term of this patent is extended or adjusted under 35 U.S.C. 154(b) by 2677 days.

(21) Appl. No.: 10/006,089

(22) Filed: Dec. 6, 2001

(65) Prior Publication Data

US 2002/0093857 A1 Jul. 18, 2002

Related U.S. Application Data

(60) Provisional application No. 60/251,627, filed on Dec. 6, 2000, provisional application No. 60/251,952, filed on Dec. 7, 2000.

(51) Int. Cl.
*G06F 9/44* (2006.01)
*G06F 7/00* (2006.01)
*G06F 17/30* (2006.01)
*G06F 15/16* (2006.01)

(52) U.S. Cl. ............. 717/120; 726/6; 726/18; 707/610; 707/741; 709/217

(58) Field of Classification Search .................. 717/120; 707/2, 10, 203
See application file for complete search history.

(56) References Cited

U.S. PATENT DOCUMENTS

| | | | |
|---|---|---|---|
| 5,724,575 A * | 3/1998 | Hoover et al. .................. 707/10 |
| 5,835,765 A | 11/1998 | Matsumoto | |
| 6,016,478 A | 1/2000 | Zhang et al. | |
| 6,189,000 B1 * | 2/2001 | Gwertzman et al. ............ 707/10 |
| 6,269,405 B1 * | 7/2001 | Dutcher et al. ................ 709/248 |
| 6,321,264 B1 | 11/2001 | Fletcher et al. | |
| 6,377,950 B1 * | 4/2002 | Peters et al. ..................... 707/10 |
| 6,578,069 B1 * | 6/2003 | Hopmann et al. ............. 707/203 |
| 6,766,368 B1 | 7/2004 | Jakobson et al. | |
| 6,799,208 B1 | 9/2004 | Sankaranarayan et al. | |

OTHER PUBLICATIONS

International Search Report for PCT/US01/46662 mailed Jul. 10, 2003.
La Meyer, et al., "On Designing a Database for Integrated User Managem nt: Pitfalls and Possibilities" Boston University 'Online!', retrieved from www.usenix.org/events/lisa-nt2/000/lameyer/lameyer.pdf, 4 sheets, Aug. 2000.
Arbee, et al., "Schema Integration and Query Processing for Multiple Object Databases", National Tsing Hua University, 'Online!', pp. 1-27, retrieved from www.citseer.nj.nec.com/chen95schema/html, on Jun. 24, 2003.

(Continued)

*Primary Examiner* — Michael J Yigdall
(74) *Attorney, Agent, or Firm* — Robert C. Kowert; Meyertons, Hood, Kivlin, Kowert & Goetzel, P.C.

(57) ABSTRACT

A system and method for managing information on a network using an identity index may include a software program stored on a computer-readable medium which is operable to associate one or more users with the information objects that define the user. The software program can maintain a "virtual identity" for each user, the virtual identity comprising a list of information objects (e.g., accounts) associated with the user and the identities of resources at which the information objects can be found. The list of information objects may include an information object identifier for each information object. The software program may maintain a resource definition for each identified resource. The resource definition may include a set of connection parameters that can be used by the software program to connect to the corresponding resource.

23 Claims, 4 Drawing Sheets

OTHER PUBLICATIONS

Parent; et al., "Issues and Approaches of Database Integration" Communications of the Association for Computing Machinery, Association for Computing Machinery, New York, vol. 41, No. 5; pp. 166-178, 1998.

Gamal-Eldin, et al., "Integrating Relational Databases with Support for Updates", CH2665-8/88/0000/0202$01, pp. 202-209, Dec. 5, 1998.

International Search Report for PCT/US01/46978 mailed Jul. 31, 2003.

Fink, J., "Institute white pages as a system administration problem", Proceedings of the Tenth Systems Administration Conference (LISA '96) Proceedings of 10TH Unsenix Systems Administration Conference (LISA '96), Chicago, IL, USA, Sep. 29, 1996.

Remote Procedure Call http://en.wikipedia.org/wiki/remote_procedure_call (1 page).

* cited by examiner

SYSTEM AND METHOD FOR MANAGING INFORMATION OBJECTS

RELATED INFORMATION

This application claims priority under 35 U.S.C. §119(e) to U.S. Provisional Patent Application Ser. No. 60/251,627 entitled "System and Method for Automatically Discovering Information," filed on Dec. 6, 2000, which is hereby fully incorporated by reference. This application also claims priority under 35 U.S.C. §119(e) to U.S. Provisional Patent Application Ser. No. 60/251,952 entitled "System and Method for Tracking Information in a Pointer-Driven Repository," filed on Dec. 7, 2000, which is hereby fully incorporated by reference.

TECHNICAL FIELD OF THE INVENTION

The present invention relates generally to systems and methods of systems management. More particularly, the present invention relates to a system and method for managing distributed information objects. Even more particularly, embodiments of the present invention relate to a system and method for managing distributed information data using an index containing references to distributed information objects.

BACKGROUND OF THE INVENTION

Processing and storage of electronic data is now essential to the daily operation of most organizations. With the advent of networking technology, organizations that utilize electronic data processing are becoming increasingly reliant upon "enterprise" computer networks in which processing and storage are distributed over a number of heterogeneous interconnected computers. In many enterprise systems, a member of the organization will have access to multiple resources across the system. For example, an employee of a corporation may use an email account, an operating system account, such as a Windows NT™ account, and a Unix™ account to access and process data stored on the enterprise system ("Windows NT" and "Unix" as used herein are trademarks of their respective owners). Additionally, organizations will often wish to provide external users, such as distributors, business partners and suppliers, with accounts granted limited access to the data stored on the enterprise system. The administrative overhead required to manage the internal and external accounts often becomes more difficult to manage than the data that is actually of interest to the organization. This can lead to decreases in system efficiency and to high support costs.

Consequently, organizations are becoming increasingly interested in efficient systems management as it can provide, among other benefits, reduced information technology ("IT") costs and increased efficiency in setting up and managing enterprise data. Currently, however, providing efficient systems management for enterprise computer networks, particularly those that contain legacy data, is a quixotic task. This is partly because many organizations, over time, have developed networks including a variety of heterogeneous computer systems storing a myriad of data types. Further adding to the complexity of managing enterprise networks, organizations often store inconsistent data across the network. As just one example of data inconsistencies, a company may store one home phone number for an employee at a corporate human resources ("HR") mainframe while storing a different home phone number at a departmental mainframe. Because the two mainframes may be heterogeneous (e.g., employ different hardware, operating systems, protocols, tools and/or applications), synchronizing the two resources to eliminate inconsistencies can prove difficult.

Figure 1:
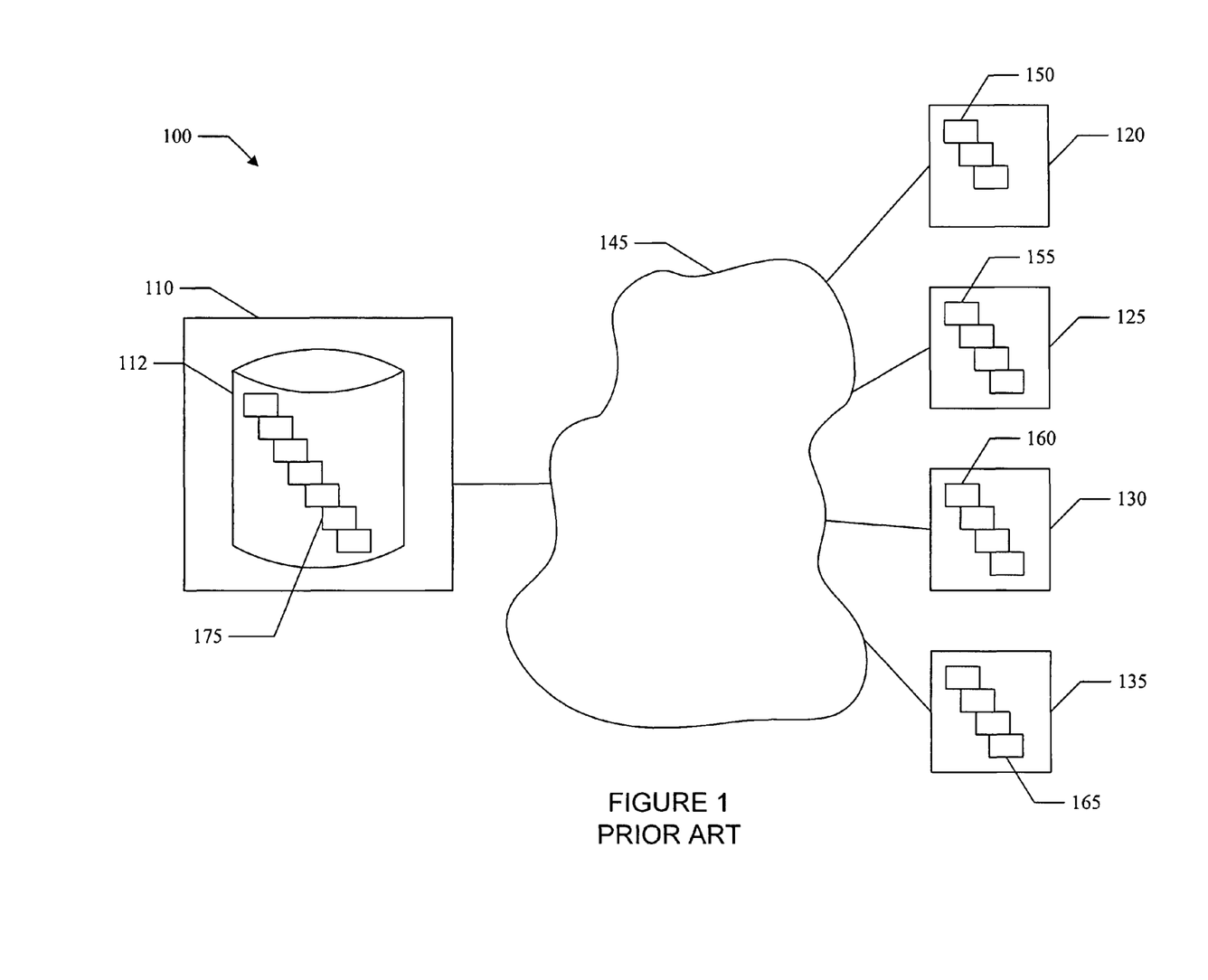
FIG. 1 illustrates a prior art system for systems management in which data is replicated at a centralized database.

Most prior art systems management techniques address these difficulties by centralizing data. Profile-based management systems, directory-based management systems, and meta-directories offer various approaches to centralizing data storage. FIG. 1 illustrates the limitations of prior art systems that rely on centralization of data. FIG. 1 is a diagrammatic representation of computer system 100 comprising an administrative system 110, including a centralized database 112, and resources including an email server 120 (such as a Microsoft Exchange™ server), a Unix system 125, a Windows NT system 130 and a mainframe 135 ("Microsoft Exchange" as used herein is a trademark of its respective owner). The resources are interconnected to each other and are connected to administrative system 100 via a network 145. Each resource can contain a collection of data items that represent entities or individuals. For example, e-mail server 120 can contain a collection of email accounts 150, Unix system 125 can contain a collection of Unix accounts 155, Windows NT system 130 can contain a collection of Windows NT accounts 160 and mainframe 135 can contain a collection of data records 165.

These collections of data represent each resource's "view" of an individual or entity. In the case of an employee Jane Doe, for example, email server 120 may refer to her as janed (i.e., her e-mail user name), Unix system 125 may refer to her as JaneD (i.e., her Unix account user name) or by her Unix identification ("UID"), and Windows NT system 130 may refer to Jane Doe as JANED (i.e., her Windows NT account user name). In addition to account information allowing Jane Doe to access data on computer system 100, information such as Jane Doe's department code, time keeper number, salary rate, and employee identification can be stored at mainframe 135. This may be information that is not personally used by Jane Doe, but it is instead used by her managers or other personnel. Thus, mainframe 135 would also maintain an identity for Jane Doe, based on her employee record, which could, for example, be stored under JANE_D.

To illustrate the shortcomings of prior art systems that rely on centralization of data, assume that employee Jane Doe marries and changes her last name to Smith. One method of updating Jane Doe's name on system 100 would be to separately enter the updated information at each system. For an organization having a large number of users and/or a highly distributed computer system 100, this can be impractical. To ameliorate the inefficiencies of separately entering information at each resource, one prior art system replicates all the information identifying individuals or entities in a centralized database 112 (represented by replicated data 175). Thus the collection of email accounts 150, the collection of Unix accounts 155, the collection of Windows NT accounts 160 and the collection of data records 165 are typically replicated at centralized database 112. When a change is made to the data, the change can be entered to replicated data 175 and can then be pushed out to each of the resources. In the case of Jane Doe, then, replicated data 175 is modified to account for her name change, and the replicated data can then be pushed out to one or more resources. In the case of an individual such as Jane Doe, the replicated data, thus, contains a "master copy" of her data.

While a system having a centralized database helps ensure data consistency for data entered through administrative system 110 and pushed out to each resource, it has several shortcomings. One such limitation involves the resolution of inconsistencies between data changed at the individual resources. Continuing with the example of newlywed Jane Doe; if Jane Doe changes her last name to Smith, her name may be inadvertently changed to Smyth at mainframe 135, while her name is changed to Smith at email server 120. When data from the resources is copied to centralized database 112, there will be three names for the same employee on computer system 100: Jane Doe, Jane Smyth and Jane Smith. Administrative system 110 must determine if a name change is actually appropriate and which of the changes is appropriate. Once the specific change is selected, the change is distributed to the resources, overwriting local changes (or lack of changes) made at each resource. Thus, for example, if Jane Smyth was arbitrarily selected as the correct change, Jane Smyth would be distributed to each of the resources, overwriting the correct name, Jane Smith.

Furthermore, if different resources are controlled by different groups within the organization, the decision to favor one resource over another can lead to political tension within the organization. As an additional limitation of this prior art system, in a large enough computer system 100, some subset of the resources will be unavailable at any given time due to connectivity issues or other technical problems. Therefore, only some of the resources will be updated, causing additional inconsistencies in Jane Doe's data.

Centralization of data typically requires replicating at least some subset of the data being managed. This type of system scales poorly because of the large amount of data that must be stored at the centralized database 112 and it further introduces problems with synchronizing the centralized database 112 with the resources. Furthermore, because these systems require data to be copied repeatedly back and forth from the resources to the centralized database 112, significant bandwidth demands are inflicted upon the network. As yet another shortcoming, manually locating and organizing data from a number of resources typically requires significant investments of time and money. Thus, prior art systems are generally expensive and inefficient.

SUMMARY OF THE INVENTION

Embodiments of the present invention comprise a system and method for managing information on a network that substantially reduce or eliminate the disadvantages or problems associated with previous systems management methods and systems. More particularly, embodiments of the present invention provide a system and method for managing distributed information on a network using an identity index.

Embodiments of the present invention can provide a system and method for method information using an identity index. One embodiment of the present invention can include a software program stored on a computer-readable medium which is operable to associate one or more users with the information objects that define the user. The software program can maintain a "virtual identity" for each user, the virtual identity comprising a list of information objects associated with the user and the identities of resources at which the information objects can be found. In one embodiment of the present invention, the list of information objects can include an information object identifier (i.e., a native key or an arbitrary identifier meaningful to the resource) for each information object. The software program can also maintain a resource definition for each identified resource. The resource definition can include a set of connection parameters that the software program can use to connect to the corresponding resource. Based on the resource definition and the information object identifier, embodiments of the present invention can connect to each resource and locate the information objects on those resources.

In one embodiment of the present invention, each resource definition can further comprise a schema map associating attributes stored on a resource (e.g., "resource attributes") with virtual attributes defined by the schema map. The software program can create a composite view of the user based on the virtual attributes defined by the schema map and can display the composite view in a customizable graphical user interface.

In one embodiment of the present invention, the information objects can comprise user accounts. Thus, embodiments of the present invention can associate user accounts stored on multiple resources with a user. Attributes which define the user accounts can be represented in the composite view as virtual attributes based on the resource schema maps. When a virtual attribute is modified, the changes can be pushed back to the resource attributes based on the schema map. Thus, resource attributes can be modified without having to replicate the associated information object at a centralized database.

Embodiments of the present invention provide an advantage over prior art systems and methods by substantially reducing the amount of storage required to manage data.

Additionally, embodiments of the present invention provide an advantage over prior art systems and methods by reducing the amount of bandwidth required to manage data.

Furthermore, embodiments of the present invention do not replicate information objects at a centralized database, but create an index of where the data objects reside, embodiments of the present invention can provide a higher degree of scalability than prior art systems.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts.

Embodiments of the present invention can provide a system and method for managing information using an identity index. One embodiment of the present invention can include a software program stored on a computer-readable medium which is operable to associate one or more users with the information objects that define the user. The software program can maintain a "virtual identity" for each user, the virtual identity comprising a list of information objects associated with the user and the identities of resources at which the information objects can be found. In one embodiment of the present invention, the list of information objects can include an information object identifier (i.e., a native key or an arbitrary identifier meaningful to the resource) for each information object. The software program can also maintain a resource definition for each identified resource. The resource definition can include a set of connection parameters that the software program can use to connect to the corresponding resource. Based on the resource definition and the information object identifier, embodiments of the present invention can connect to each resource and locate the information objects on those resources.

In one embodiment of the present invention, each resource definition can further comprise a schema map associating attributes stored on a resource (e.g., "resource attributes") with virtual attributes defined by the schema map. The software program can create a composite view of the user based on the virtual attributes defined by the schema map and can display the composite view in a customizable graphical user interface.

In one embodiment of the present invention, the information objects can comprise user accounts. Thus, embodiments of the present invention can associate user accounts stored on multiple resources with a user. Attributes that define the user accounts can be represented in the composite view as virtual attributes based on the resource schema maps. When a virtual attribute is modified, the changes can be pushed back to the resource attributes based on the schema map.

For the purposes of this application, the term "resource" can mean a system or application accessible via a network that defines information objects related to its management or operation. For example, a Unix system can be a resource that defines accounts (i.e., information objects), typically in its /etc/passwd file, a Windows system can be a resource that defines user accounts in its User Manager application, and a DBMS system can be a resource that defines user accounts in special table or tables. It should be noted that a resource can comprise a particular computer system (distributed or undistributed), an application on a computer system, or an application distributed across several computer systems, such as a Network Information System ("NIS"). A "user" can be a human, a programmatic or a computer system that uses the resources. An "information object" can be a collection of one or more pieces of data that can represent a single entity or identity. In other words, an information object can represent a resources "view" of an entity, such as a user. An attribute can be a single piece of information (e.g., an attribute with a name, a data type and zero, one or more values) that constitutes at least part of an information object. A "schema" can be the structure of and relationships between classes of information objects on a resource, including the set of data items (attributes) the resource defines to describe each information object. A "virtual identity" can be a composite identity of a user based on one or more information objects stored on one or more resources.

Figure 2:
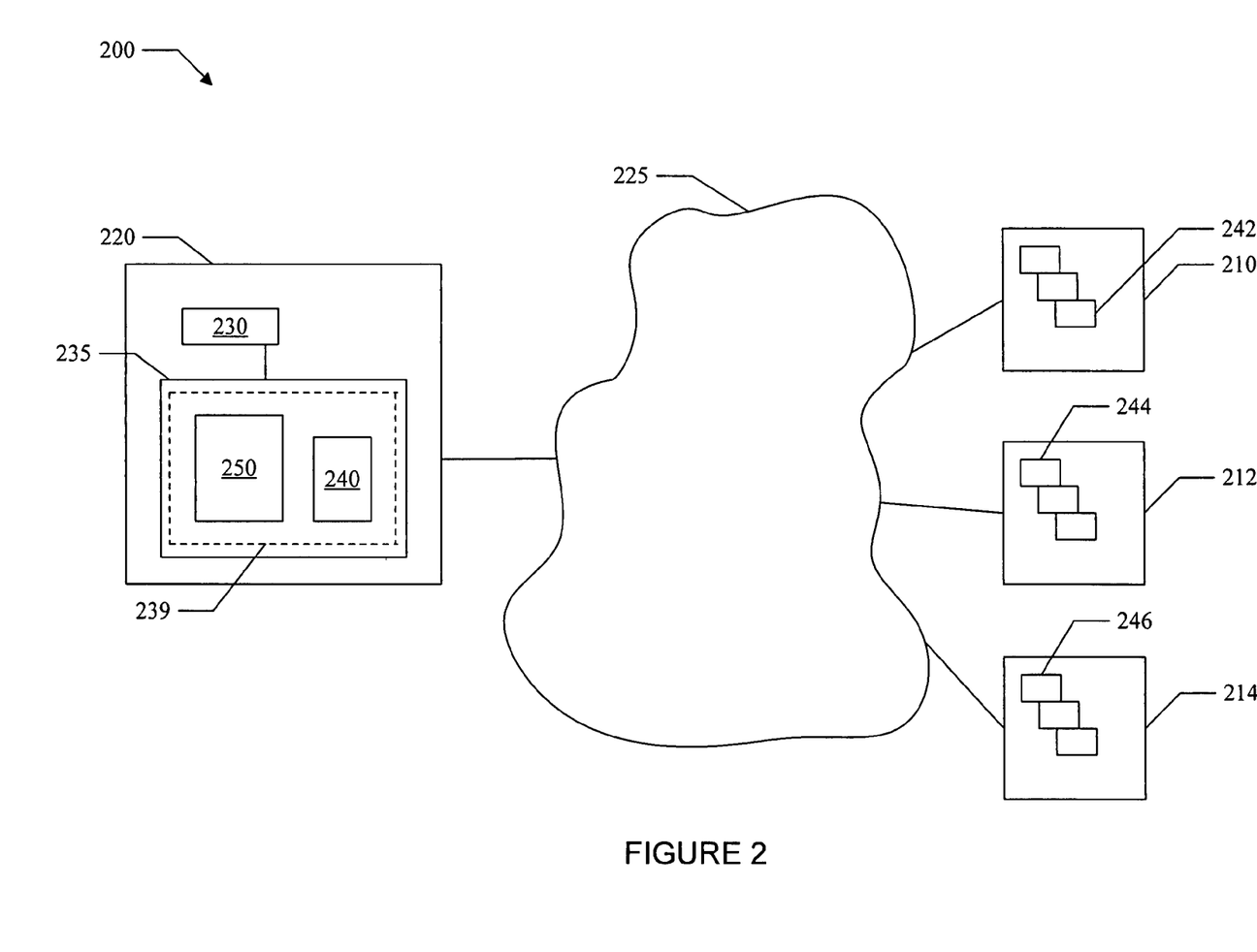
FIG. 2 illustrates one embodiment of a computer system in which the teachings of the present invention can be implemented.

FIG. 2 illustrates a system 200 in which one embodiment of the present invention can be implemented. System 200 can comprise a plurality of resources (here, indicated as resource 210, resource 212, and resource 214). Each resource can include a computer system (either discrete or distributed) and/or an application on a computer system. While system 200 includes multiple resources, it should be understood that the present invention can be implemented in a system having only one resource. System 200 can also include an administrative system 220 operable to access the resources via network 225, which can be a LAN, WAN, global area network (e.g., the internet, wireless network) or any other electronic communications network known in the art. Administrative system 220 can comprise a computer processor 230, a computer-readable memory 235 (e.g., RAM, ROM, computer-readable magnetic storage device and/or other computer-readable memories known in the art) and a management system 239 stored on computer-readable memory 235. Management system 239 can include a software program 240 operable to maintain an identity index 250 associating users of system 200 with information objects and resources. While administrative system 220 is shown as a discrete system, it should be understood that administrative system 220 can be distributed and/or implemented in the same physical unit(s) as one or more of the resources.

Each resource can define information objects related to the management or configuration of the associated resource. By way of example, resource 210 can comprise an Oracle database system including employee records 242 as information objects; resource 212 can comprise a Unix system containing a set of Unix user accounts 244; and resource 214 can comprise a Windows NT system containing a set of NT user accounts 246. The resource accounts (i.e. information objects) represent each resource's "view" of a particular user. In other words, each resource account (and the attributes that make up that account) can represent a user within the scope of the resource.

It should be noted that not all users will have access to all the resources in system 200. Thus, some resources may contain information objects that define some users, but not others. Identity index 250 can store information mapping the information objects that describe a particular user to that user. Rather than storing all of the actual data from an information object, identity index 250 can store information about how to connect to resources, how to retrieve each information object and how to map the information object to a standard representation. Based on identity index 250, software program 240 can retrieve data items from each resource and present the data items in a canonical format without replicating the data items at a centralized database (e.g., without storing the values for the data items in nonvolatile memory). While the present invention will be described primarily in terms of managing computer accounts of various formats accessed by human users, the teachings of the present invention are equally applicable to associating any type of information object to a user. Thus, for example, embodiments of the present invention are configurable to associate routing tables on various servers to a particular network element, and so on.

Figure 3:
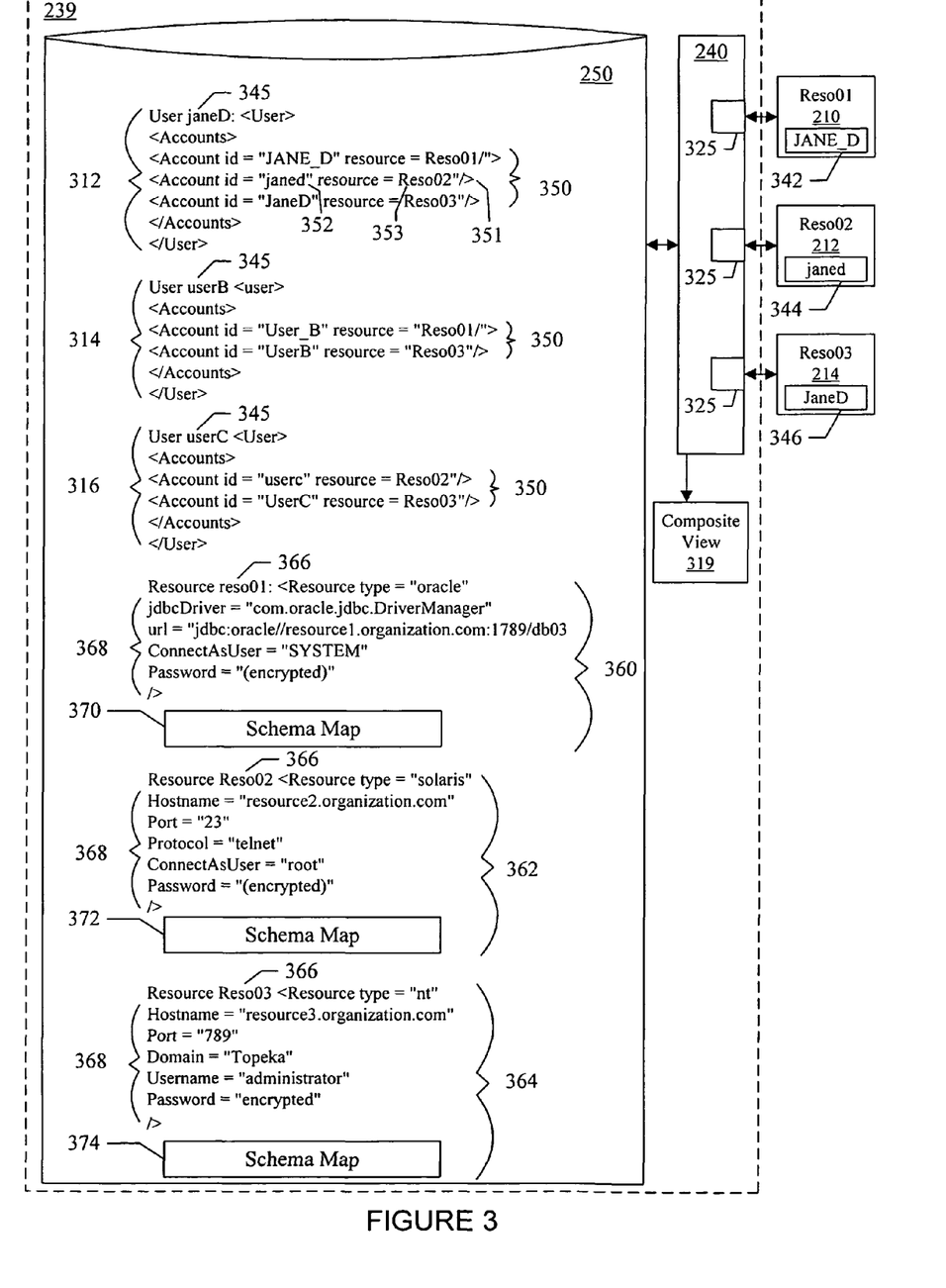
FIG. 3 illustrates a system of account management according to one embodiment of the present invention.

FIG. 3 is a diagrammatic representation of a management system 239 for managing information objects according to one embodiment of the present invention. Management system 239 can comprise software program 240 for managing users and resource accounts, identity index 250 to associate users with resource accounts, schema maps (e.g., schema map 370, schema map 372 and schema map 374, discussed below) to associate resource attributes to virtual attributes, and a composite view 319 to present a "view" of a user according to one or more resources.

Software program 240 can invoke resource adapter modules 325 to communicate with a database system, such as an Oracle™ database system 210, Unix system 212, and NT system 214 ("Oracle" as used herein is a trademark of its respective owner). It should be noted that the resource adapter modules described are provided by way of example only. One resource adapter module 325 is typically operable to communicate with a particular resource type (e.g., one resource adapter 325 can be invoked to communicate with all the Unix systems), however separate resource adapter modules 325 can also be used for each resource, as illustrated in FIG. 3. As would be understood by one of ordinary skill in the art, resource adapter module 325 can also be custom programmed to communicate with any resource type.

In the embodiment illustrated in FIG. 3, identity index 250 can contain a number of virtual identities (e.g., virtual identities 312, 314 and 316). Each virtual identity 312, 314 and 316 can contain a virtual user name 345 and a list of information objects 350 associated with the virtual identity. In one embodiment of the present invention, the virtual user name 345 can be used as a native key for locating and retrieving the associated virtual identity from identity index 250. The list of associated information objects 350 contains one or more entries, such as entry 351, associating an information object with a resource. Each entry can contain an information object native key (e.g., native key 352) and a resource name (e.g., resource name 353) for the resource on which the associated information object is located. It should be noted that the resource name can be any arbitrary identifier used to reference a particular resource. Furthermore, rather than storing a native key, identity index 250 can store any arbitrary information object identifier that software program 240 can translate or map to a native key or identifier meaningful to the resource upon which the information object is located. Each virtual identity can also include any additional attributes the organization wants stored in the virtual identity (e.g., if the organization wants to be able to search the virtual identities by user name, they may also wish to store attributes such as "firstname," "lastname," or "fullname").

Additionally, identity index 250 can include resource definitions, such as resource definition 360, resource definition 362 and resource definition 364. Each resource definition can include a resource name 366 and a set of connection information 368. Each set of connection information 368 can contain the connection parameters used by software program 240 to connect to the corresponding resource (e.g., hostname, domain, a resource user name, a resource password, a port and so on). For example, resource definition 360 can contain information sufficient for software program 240 to connect to Oracle system 210, resource definition 362 can contain information sufficient for software program 240 to connect to Unix system 212 and resource definition 364 can contain information sufficient for software program 240 to connect to Windows NT system 214. Thus, resource definition 360 can contain the following information:

Resource name=Reso01
    Resource type="Oracle"
    jdbcDriver="com.Oracle.jdbc.DriverManager"
    url="jdbc:oracle//resource1.organization.com:1789/db03
    Username="SYSTEM"
    Password="*******"

Similarly, resource definition 362 can contain the following information:

Resource name="Reso02"
    Resource type="solaris"
    Hostname="resource2.organization.com"
    Port="23"
    Protocol="telnet"
    Username="root"
    Password="*******"

Resource definition 364 can contain the following:

Resource name="Reso03"
    Resource type="nt"
    Hostname=resource3.organization.com
    Port="789"
    Domain="Topeka"
    Username="administrator"
    Password="*******"

The resource definitions provided above are exemplary only and it should be understood that any information used to connect to a resource can be used. For example, for Unix system 212, software program 240 can connect with different protocols than telnet (e.g., SSH) and can connect as a different user than "root." The connection information contained in identity index 250 can vary depending on the resources available on system 200 and the amount of access to resources that software program 240 is permitted. For example, if management system 239 is implemented by an entity other than the organization controlling system 200, then the organization may wish to limit access to the resources of system 200. It should be noted that the user names and passwords provided in the resource definitions might not comprise the user names and passwords used to connect to individual accounts.

As an example of one embodiment of identity index 250, assume user "Jane Doe" has an Oracle database account 342 on Oracle database system 210, a Windows NT account 346 on Windows NT system 214 and a Unix account 344 on Unix system 212. Further assume that Oracle database account 342 has the account name "JANE_D"; Unix account 344 has the account name "janed"; and Windows NT account 346 has the account name "JaneD." In such a case, the virtual user name 345, as illustrated in FIG. 3, can be "janeD" or any other arbitrary identifier. Furthermore, an information object list 350 could contain a list of native keys for Jane Doe's user accounts and the associated resource name for the resource on which each account can be found. Thus, for example, entry 351 can contain the values of "janed" as native key 352 and "Reso02" as resource name 353. Because resource name 353 corresponds to resource name 366 of resource definition 362, software program 240 can connect to Unix system 212 based on resource definition 362 to locate Jane Doe's Unix account 344. Furthermore, because entry 351 contains the native key "janed," software program 240 will be able to locate Jane Doe's Unix account 344 on Unix system 212. Thus, as would be understood by one of ordinary skill in the art, identity index 250 can associate a information object (e.g., a user account) with a user and a resource so that the information object can be located without replicating the information object at a centralized database. It should be noted that while FIG. 3 depicts the native key 352 and the resource name 353 stored contiguously, entry 351 can, in practice, be distributed. For example, native key 352 can be stored in one row of a relational database table, while resource name 353 of the same entry 350 can be stored in a different row and/or a different table.

Figure 4:
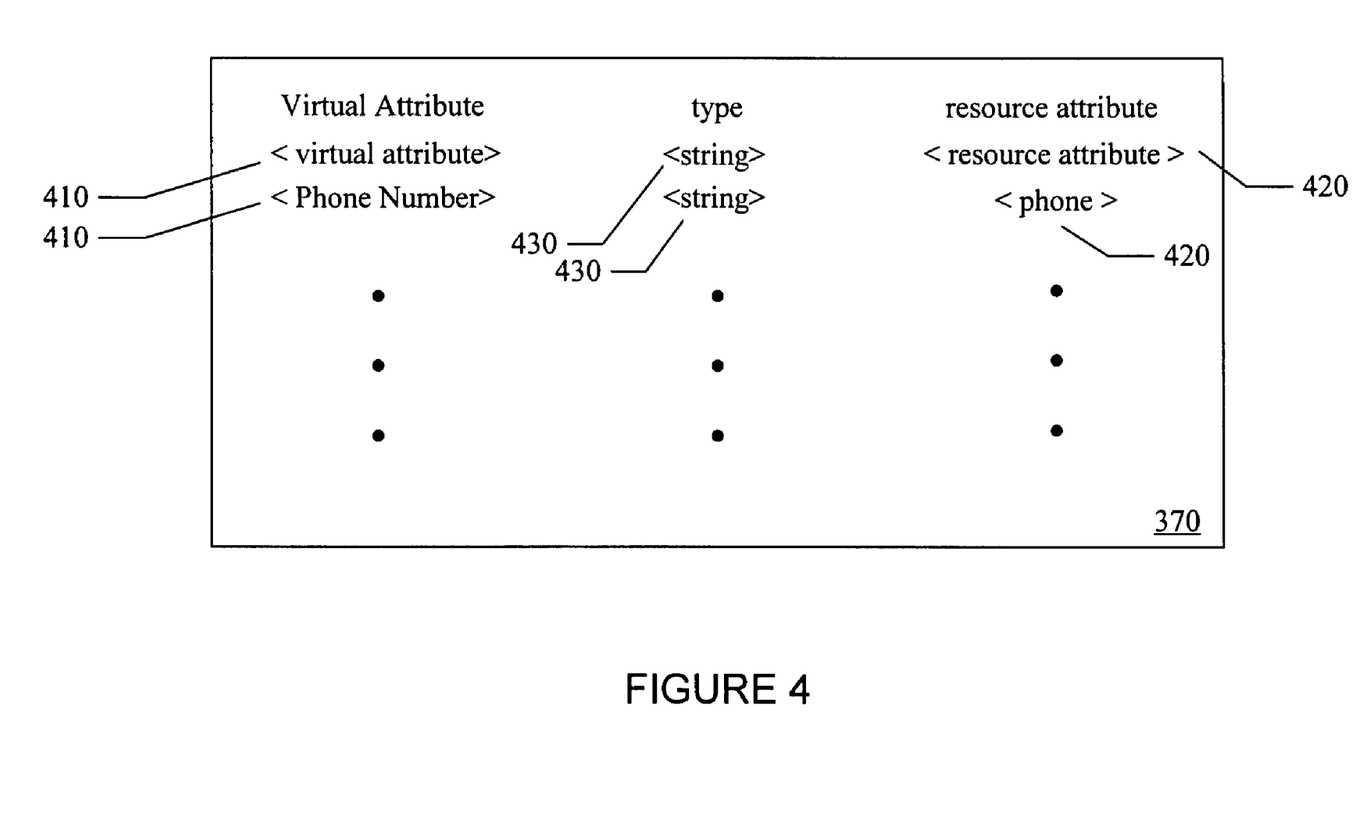
FIG. 4 illustrates a schema map according to one embodiment of the present invention.

Additionally, each resource definition can include a schema map. For example, resource definition 360 can include schema map 370 (an embodiment of which is illustrated in FIG. 4), resource definition 362 can include schema map 372, and resource definition 364 can include schema map 374. A schema map can associate resource-specific information object (e.g., account) attributes to a virtual attribute defined in the schema map. In this manner, the schema map allows software program 240 to display attributes values (i.e. data items) from different resources in a common format. It should be noted that the schema map can be used to manipulate the value of the resource attribute to derive a value for the corresponding virtual attribute.

For example, attributes from different resources can be mapped to the same virtual attribute. Thus for example, if Oracle database system 210 contained an attribute named "phone" and Unix system 212 contained an attribute name "ph_num," schema maps 370 and 372 could, respectively, map the attributes to a virtual attribute named "Phone Number." In one embodiment of the present invention, the values for the virtual attribute "Phone Number" need not be stored in identity index 250. Instead, when a virtual identity is accessed, software program 240 can access the attributes "ph_num" and "phone," store the values in RAM and display the values under "Phone Number" in composite view 319, as will be described in greater detail below.

Composite view 319 can comprise a "view" of a user's accounts as defined by a schema map. Based on the schema map(s), composite view 319 can contain virtual attribute values derived from the resource-specific attributes for a user and can be presented to administrators and users through a graphical user interface. When a virtual identity is accessed, software program 240 can invoke the appropriate resource adapter modules 325, communicate with the resources associated with the virtual identity and locate the information objects (e.g., accounts) based on the native key provided for each information object. Software program 240 can retrieve a set of resource attributes, map the resource attributes to a set of virtual attributes (i.e., create a "virtual information object" and display the virtual attributes in composite view 319. In one embodiment of the present invention, the virtual attributes are stored in volatile memory (e.g., RAM). In other words, software program 240 can present an "in-memory" representation of a user (a "virtual information object") based on the information objects associated with the user via the user's virtual identity. In one embodiment of the present invention, software program 240 can display composite view 319 in a graphical user interface. The actual display can be governed by a customizable form.

As noted earlier, a schema map can associate resource attributes from more than one resource with the same virtual attribute. In one embodiment of the present invention, when two or more resource attributes mapped to the same virtual attribute differ in value, all the values can be displayed as part of composite view 319, one value can be selected for display, or the resource attributes can be forced to a common value. When changes are made to a virtual identity (e.g., through manipulation of a virtual attribute value in a graphical user interface), the change can be pushed out to each resource attribute mapped to the virtual attribute by the schema map(s). Thus, data across resources can be synchronized without persistently replicating the attributes at a centralized database (i.e., without storing copies of resource attribute values in a centralized database).

As disclosed and described in the foregoing discussion, identity index 250 can associate users with information objects and the resources on which those information objects are located. In one embodiment of the present invention, identity index 250 can store "meta-information" about information objects stored on system 200 (e.g., can store information about how to locate information objects on system 200). Hence, identity index 250 can maintain some state information (e.g., the location of information objects on system 200), but remains "stateless" in that it can avoid persistently storing the actual data of the information objects. Embodiments of the present invention can, thus, provide for "quasi-stateless" management of distributed information objects in system 200. Because information objects are not replicated in some embodiments of identity index 250, embodiments of the present invention are highly scalable and the storage requirements of implementing the present invention are largely unaffected by the amount of data associated with each information object. Furthermore, because changes to virtual attributes can be pushed out to resources on an attribute-by-attribute basis rather than on an information-object-by-information-object basis (as with some prior art systems) embodiments of the present invention reduce bandwidth requirements for network 225. It should be noted that identity index 250 can be constructed manually by, for example, a systems administrator entering the information included in identity index 250 through a graphical user interface or identity index 250 can be constructed through a software implemented discovery process. One embodiment of a system and method for discovering information that can be used to construct identity index 250 is disclosed and described in U.S. patent application Ser. No. 10/006,763, entitled "System and Method of Discovering Information," filed Dec. 6, 2001.

It should be noted that any data storage scheme known in the art can be used to maintain identity index 250. By way of example, but not of limitation, data storage schemes that can be utilized by embodiments of the present invention include sequential file, indexed file, LDAP directory, and relational database. Sequential files are generally inexpensive to implement and can be used with a variety of systems. However, as the size of identity index 250 increases, the access times for a sequential file will rapidly increase because such files must usually be scanned or parsed in order to find a desired piece of data. Indexed files are also relatively cheap and are easily scalable. However, indexed files typically allow access through a single key. LDAP directory services are relatively inexpensive and are becoming increasingly available. The LDAP protocol is optimized to read rather than write, so it lends itself to data that is read frequently, but updated infrequently. LDAP directories can scale to handle large amounts of data but access times can scale poorly. As would be understood by one of ordinary skill in the art, relational database management systems are highly scalable, and use sophisticated techniques to optimize access, transaction, backup and recovery.

FIG. 4 illustrates one embodiment of a schema map (e.g., schema map 370 of FIG. 3). A schema map for a particular resource, such as schema map 370, can contain a virtual attribute 410, resource attribute 420 and an attribute type 430. In the example of FIG. 4, one virtual attribute 410 is "Phone Number," whereas the corresponding resource attribute 420 is "phone." When software program 240 reads the resource-specific attribute "phone" associated with a user's resource account, software program 240 can map the value for "phone" to the value for the virtual attribute "Phone Number." Thus, the value of "phone" can be contained in composite view 319 as the value for "Phone Number." It should be noted that the value for "Phone Number" might not be saved in nonvolatile memory (e.g., with identity index 250), but may instead only be saved in RAM while the virtual identity is being manipulated (e.g., being viewed).

In schema map 370, attribute type 430 can comprise "string" and "Boolean" or other possible attribute types as would be understood by those of ordinary skill in the art. The attribute type 430 field can be used to map different types of attributes together. It should be noted that in some embodiments of the present invention, not every resource attribute will be mapped to a virtual attribute. These unmapped attributes will typically not appear in composite view 319, identity index 250 or schema map 370. This might occur, for example, if an organization implementing an embodiment of this invention does not want particular attributes to be discoverable, such as employees' social security numbers.

It should be further noted that if all instances of a resource type are the same, a schema map can be defined for a resource type rather than on a resource-by-resource basis. As such, for example, there would be one schema map for NT systems, on schema map for Unix, one schema map for LDAP and so on. However, in many cases an organization may configure the same resource in several ways. For example, an organization may store different types of data in an NT systems "description" field on different systems. Thus, each resource may require a unique schema map.

The present invention comprises a system and method for managing information on a network that substantially reduce or eliminate the disadvantages or problems associated with previous systems and methods of managing information. More particularly, embodiments of the present invention can provide a system and method for tracking information using an identity index. One embodiment of the present invention can include a software program stored on a computer-readable medium that is operable to associate one or more users with the information objects that define the user. The software program can maintain a "virtual identity" for each user, the virtual identity comprising a list of information objects (e.g., accounts) associated with the user. Additionally, each information object can be associated with the resource at which the information object is located. In one embodiment of the present invention, the list of information objects can include an information object identifier (i.e., a native key or an arbitrary identifier meaningful to the resource upon which the information object is located) for each information object. The software program can also maintain a resource definition for each identified resource. The resource definition can include a set of connection parameters that can be used by the software program to connect to the corresponding resource. Based on the resource definition and the information object identifier (e.g., the native key for the information object), embodiments of the present invention can connect to each resource and locate the information objects on those resources.

In one embodiment of the present invention, each resource definition can further comprise a schema map correlating attributes stored on a resource (e.g., "resource attributes") with a virtual attribute defined by the schema map. The software program can create a composite view of the user based on the virtual attributes defined by the schema map and can display the composite view in a customizable graphical user interface.

In one embodiment of the present invention, the information objects can comprise user accounts. Thus, embodiments of the present invention can associate user accounts stored on multiple resources with a user. Attributes which define the user accounts can be represented in the composite view as virtual attributes based on the resource schema maps. When a virtual attribute is modified, the changes can be pushed back to the resource attributes based on the schema map.

Although the present invention has been described in detail herein with reference to the illustrative embodiments, it should be understood that the description is by of example only and is not to be construed in a limiting sense. It is to be further understood, therefore, that numerous changes in the details of the embodiments of this invention an additional embodiments of this invention will be apparent to, and may be made by, persons of ordinary skill in the art having reference to this description. It is contemplated that all such changes and additional embodiments are with the scope of this invention as claimed below.

What is claimed is:

1. A system for managing information, comprising:
 a non-transitory computer-readable medium storing a software program operable to maintain an identity index, wherein said identity index comprises:
  a plurality of index keys, wherein each index key indexes a virtual identity of a respective one of a plurality of users;
  a plurality of virtual identities, wherein each virtual identity is indexed within the identity index by one the plurality of index keys, wherein each virtual identity is a virtual identity of a respective one of the plurality of users, wherein each virtual identity comprises identity information of the respective user in regard to multiple different computer resources used by the same respective user, and wherein one or more of the virtual identities comprises:
   a plurality of information object identifiers, wherein each information object identifier identifies a respective information object of the respective user stored at a respective one of the multiple different computer resources; and
   a plurality of resource names, wherein each resource name identifies which one of the multiple different computer resources contains a respective one of the information objects of the respective user, wherein each said resource name is linked to a respective one of the plurality of information object identifiers; and
  wherein said identity index further comprises a plurality of resource definitions, wherein each resource definition is a definition of a respective one of the multiple computer resources, wherein each resource definition comprises connection information for the respective computer resource; and
  wherein the software program is operable to access the identity index via one of the plurality of index keys to locate and retrieve, from within the identity index, information from a respective one of the plurality of virtual identities indexed by the one of the index keys.

2. The system of claim 1, wherein one or more of said plurality of resource definitions further comprises a schema map.

3. The system of claim 2, wherein said schema map maps a resource attribute from said resource to a virtual attribute defined by said schema map.

4. The system of claim 3, wherein a virtual attribute value for said virtual attribute is stored in RAM.

5. The system of claim 1, wherein said connection information contains a connection parameter selected from one of a hostname, a port, a resource username, a resource password or a resource type.

6. The system of claim 1, wherein at least one of said respective information objects comprises a user account.

7. The system of claim 6, wherein said information object identifier comprises an account name.

8. The system of claim 6, wherein one or more of said plurality of resource definitions further comprises a schema map.

9. The system of claim 8, wherein said schema map maps a resource attribute from said resource to a virtual attribute defined by said schema map.

10. The system of claim 9, wherein a virtual attribute value for said virtual attribute is maintained in RAM.

11. The system of claim 6, wherein said connection information contains a connection parameter selected from one of a hostname, a port, a resource username, a resource password or a resource type.

12. The system of claim 6, wherein said resource is one of a Unix system, a Windows NT system, a Oracle database system or an email server.

13. The system of claim 1, wherein said software program is operable to connect to each of said multiple different computer resources based on said respective resource definitions.

14. The system of claim 1, wherein one or more of said plurality of resource definitions further comprises a schema map; and wherein, said software program is operable to create a composite view of said virtual identity based on said schema map.

15. The system of claim 14, wherein said software program is operable to present a representation of said composite view in a graphical user interface.

16. The system of claim 15, wherein said graphical user interface is customizable.

17. A method of managing information, comprising:
  storing an identity index comprising:
    a plurality of index keys, wherein each index key indexes a virtual identity of a respective one of a plurality of users;
    a plurality of virtual identities, wherein each virtual identity is indexed within the identity index by one the plurality of index keys, wherein each virtual identity is a virtual identity of a respective one of the plurality of users, wherein each virtual identity comprises identity information of the respective user in regard to multiple different computer resources used by the same respective user, and wherein one or more of the virtual identities comprises:
      a plurality of information object identifiers, wherein each information object identifier identifies a respective information object of the respective user stored at a respective one of the multiple different computer resources; and
      a plurality of resource names, wherein each resource name identifies which one of the multiple different computer resources contains a respective one of the information objects of the respective user, wherein each said resource name is linked to a respective one of the plurality of information object identifiers; and
    a plurality of resource definitions, wherein each resource definition to is a definition of a different one of the multiple computer resources, and wherein each resource definition contains connection information for the corresponding computer resource; and
  accessing the identity index via one of the plurality of index keys to locate and retrieve, from within the identity index, information from a respective one of the plurality of virtual identities indexed by the one of the index keys.

18. The method of claim 17, wherein each information object identifier from said plurality of information object identifiers comprises one of said plurality of index keys as a native key for the corresponding information object.

19. The method of claim 18, wherein said native key comprises an account name.

20. The method of claim 17, wherein each information object comprises a user account.

21. The method of claim 17, wherein each resource definition further comprises a schema map.

22. The method of claim 21, wherein said schema map maps a resource attribute to a virtual attribute.

23. The method of claim 21, further comprising creating a composite view of a user based on said schema map from each resource definition.

* * * * *